United States Patent [19]

Atkinson et al.

[11] 4,239,630
[45] Dec. 16, 1980

[54] METHOD FOR DISSOLVING SULFUR DEPOSITS RAPIDLY

[75] Inventors: Fred T. Atkinson, Calgary, Canada; Shelby P. Sharp, Tulsa, Okla.; Lamar F. Sudduth, Glenwood, Ill.

[73] Assignee: Standard Oil Company (Indiana), Chicago, Ill.

[21] Appl. No.: 965,138

[22] Filed: Nov. 29, 1978

Related U.S. Application Data

[63] Continuation-in-part of Ser. No. 820,652, Aug. 1, 1977, abandoned.

[51] Int. Cl.³ ............................ E21B 43/00; C23G 5/02
[52] U.S. Cl. ............................... 252/8.55 B; 166/312; 252/364; 299/4; 299/5
[58] Field of Search ........................... 252/8.55 B, 364; 166/312; 299/4, 5

[56] References Cited

U.S. PATENT DOCUMENTS

| | | | |
|---|---|---|---|
| 2,237,627 | 4/1941 | Olin | 260/608 X |
| 3,314,999 | 4/1967 | Bapseres et al. | 260/608 |
| 3,531,160 | 9/1970 | Fisher | 299/5 |
| 3,846,311 | 11/1974 | Sharp et al. | 252/8.55 |

Primary Examiner—Herbert B. Guynn
Attorney, Agent, or Firm—Robert B. Stevenson

[57] ABSTRACT

A method for dissolving a deposit of elemental sulfur by contacting the deposit with dialkyl disulfides catalyzed with an aliphatic amine in which a small amount of sulfur is added to the disulfide amine mixture before it is used as a sulfur solvent. The small percentage of sulfur added increases the rate at which the disulfide dissolves such sulfur deposit.

8 Claims, 2 Drawing Figures

METHOD FOR DISSOLVING SULFUR DEPOSITS RAPIDLY

CROSS-REFERENCE TO RELATED APPLICATIONS

This is a continuation-in-part of an earlier application Ser. No. 820,652, filed Aug. 1, 1977, now abandoned.

BACKGROUND OF THE INVENTION

1. Field of the Invention

This invention relates to a method for removing solid sulfur deposited in petroleum bearing formations, oil wells, flowlines, etc., and more particularly to a method for enhancing the rate at which dialkyl disulfides dissolve solid sulfur.

2. Description of the Prior Art

The problem of sulfur accumulating in sour gas and distillate wells to plug the flow of fluids therefrom is well-known. U.S. Pat. No. 3,846,311 which was issued to two of the present inventors on Nov. 5, 1974, discusses this problem and various methods which have been used to remove the solid sulfur. As disclosed in this patent, the dialkyl disulfide sulfur solvents have a number of advantages over carbon disulfide which has been and is still used as a sulfur solvent in well applications. The patent teaches a method for increasing the amount of sulfur which a given quantity of a dialkyl disulfide solvent will dissolve with the ratio of sulfur to solvent being as high as five to one on a weight basis at high temperature. The method taught by the patent requires that the disulfide be catalyzed by addition of a small amount of aliphatic amine followed by an aging process. While the solvent produced in accordance with this reference exhibits an outstanding capability to dissolve several times its weight of sulfur, a period of at least 10 to 5 days at elevated temperature is required to obtain such material. If the reaction is allowed to take place at room temperature, e.g., 75° F., a period of at least 30 days is required, necessitating large storage volumes where the solvent is being manufactured and used on a commercial scale. Also taught in the patent at column 4 lines 26 through 30 is the fact that the aged catalyzed disulfide solution is initially slow in sulfur dissolving rate but increases after a small percentage of sulfur is dissolved in the solution.

U.S. Pat. No. 3,531,160 issued to Fisher on Sept. 29, 1970, also illustrates the use of alkyl disulfides (not catalyzed) in the removal of sulfur from wells. Fisher teaches that "sulfur reacted disulfide" has a higher capacity for dissolving sulfur than the other solvents listed in the patent. The total solvent capacity of this material for sulfur is listed as 15.5 pounds per barrel of solvent at 75° F.

It is apparent that the rate of sulfur dissolution is important in applications where the sulfur solvent is flowed through tubing to remove sulfur deposited on the inner surfaces of the well tubing. If the dissolution rate is slow, then either a larger amount of solvent has to be used or it must be flowed through the tubing very slowly to allow sufficient contact time with the sulfur. In a normal process, the solvent is also pumped a short distance out into the producing formation and allowed to soak for a time to remove sulfur deposited within the pore space of the formation. The well must be non-productive during this soaking period and for economic reasons it is therefore desirable to minimize the soaking period.

SUMMARY OF THE INVENTION

We have discovered an improved method of dissolving a deposit of elemental sulfur involving first preparing a sulfur solvent composition possessing improved kinetics relative to the dissolution of elemental sulfur and then after having prepared the improved solvent placing the solvent in contact with the sulfur deposit such as to dissolve the sulfur at an improved rate of dissolution. The sulfur solvent composition of our invention consists of a dialkyl disulfide to which has been added at least 1 part by weight of an aliphatic saturated unsubstituted amine per 100 parts by weight dialkyl disulfide and from about 5 to 40 parts by weight of sulfur per 100 parts by weight dialkyl disulfide.

Accordingly, an object of the present invention is to provide a method for increasing the sulfur dissolving rate of catalyzed dialkyl disulfide sulfur solvents.

Another object of the present invention is to provide a method for increasing the sulfur dissolving rate of an amine catalyzed disulfide oil (liquid dialkyl disulfides) with or without employing an aging period.

DESCRIPTION OF THE PREFERRED EMBODIMENT

Figure 1:
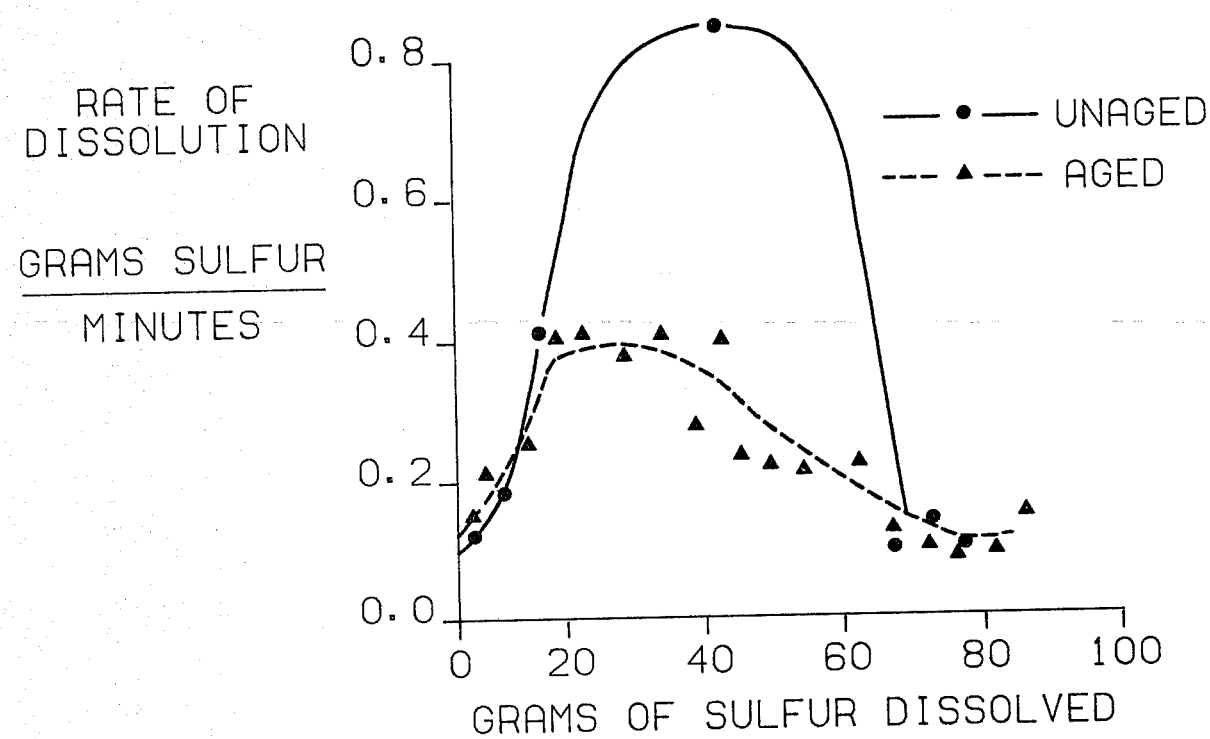
FIG. 1 of the drawing illustrates the rate of dissolving sulfur in grams/minute as a function of the amount of sulfur dissolved for both an aged and unaged amine activated dialkyl disulfide.

In U.S. Pat. No. 3,846,311, it was recognized that aged catalyzed dialkyl disulfide had an initial slow sulfur dissolution rate which increased after a small amount of sulfur was dissolved in the solvent. No explanation as to why an initial induction period occurs can be found in the patent nor was any attempt made to isolate and analyze any intermediate composition during the dissolution process such as to determine whether the liquid phase, solid phase, both or neither were contributing to this occurrence. However, this patent is hereby incorporated by reference both for its discussion of usefulness of sulfur solvents and in particular for the preparation and use of amine catalyzed dialkyl disulfide sulfur solvents.

We have now discovered that the dissolution of a small amount of sulfur, on the order of five parts by weight per 100 part dialkyl disulfide, in an aged or unaged amine catalyzed dialkyl disulfide or a mixture of amine catalyzed dialkyl disulfides increases the sulfur dissolution rate above an initial slow rate to a much higher level that of the initial rate for the aged or unaged material. Consequently, an undesired sulfur deposit can be removed much more rapidly with considerable savings in time. In addition, the unaged catalyzed solvent containing the small amount of dissolved sulfur has a higher useful total sulfur dissolution capacity even relative to the aged sulfur which is viewed in the prior art as having greater ultimate solubility for sulfur. This small amount of initially added sulfur dissolves in about one hour at 76° F. and when dissolved the solvent is immediately ready for use in a well. In this manner, tanks for long-term storage are not necessary and costs are thereby reduced. In view of this present discovery, it is now felt that the previously observed induction period is predominantly caused by the creation of a liquid phase after the addition of about 5% by weight sulfur that in fact is capable of dissolving additional sulfur at a more rapid rate than in the absence of the first 5% sulfur.

Preparation of the sulfur solvent according to the present invention can be accomplished in a variety of manners provided three key features are present. First, the major constituent is selected from a class of compounds or mixtures of compounds referred to as dialkyl disulfides. Second, at least 1 part by weight of an aliphatic amine is added per 100 parts by weight dialkyl disulfide in order to enhance the sulfur solvency of the dialkyl disulfide. And third, at least 5 parts by weight up to about 40 parts by weight sulfur is dissolved into the amine activated dialkyl disulfide in order to produce a composition which will exist in a liquid phase at the conditions at which the undesired elemental sulfur deposit is to be removed and which possess improved kinetics relative to the dissolution of this sulfur deposit.

The dialkyl disulfides useful as starting materials in preparing the improved sulfur solvent of the present invention can be viewed as involving a pair of alkyl radicals (R and R') bonded to a disulfide unit as represented in the formula R—S—S—R'. Such compounds are also referred to in the chemical literature as alkyl disulfides, thus the terms should be considered equivalent for purposes of this invention. The dialkyl disulfides include such compounds as dimethyl disulfide, diethyl disulfide, dioctyl disulfide, ditertiary tetradecyl disulfide, and the like. One particularly useful starting material is a mixture of aliphatic disulfides in which the aliphatic group therein contains from about 2 to about 11 carbon atoms; e.g., $(C_2H_5S)_2$, $(C_{11}H_{23}S)_2$, etc., typically those disulfide mixtures produced as a product stream of the Merox process described in *The Oil and Gas Journal*, Vol. 57, pp. 73–78, Oct. 26, 1959. Briefly, such mixtures of disulfides are produced by first contacting a refinery hydrocarbon stream containing aliphatic mercaptans with a caustic solution to produce corresponding sodium salt of the mercaptans. The latter are then converted to dialkyl disulfides by air oxidation, simultaneously regenerating the caustic.

The addition of the aliphatic amine in order to enhance the sulfur solvency properties of the dialkyl disulfide can be accomplished by any of the well-known methods found in the art including the method described in U.S. Pat. No. 3,846,311 except the necessity of the aging step is viewed as being optional. Also, as indicated in the U.S. Pat. No. 3,846,311 the aliphatic unsubstituted amines are believed to be uniquely suitable for activating the dialkyl disulfide. The normally liquid lower aliphatic amines of about 4 to 12 carbons atoms were found to be preferred when employed at a concentration of up to about 10 weight % based on the weight of dialkyl disulfide. Although the normally liquid lower aliphatic amines are the most convenient to handle, we have now found that higher molecular weight, easily melted, amines and in particular a group of N-alkyl-1,3-propane diamines are functionally equivalent and can be used to produce the desired amine activated dialkyl disulfide. It is also believed the normally gaseous alkyl amines are functionally equivalent provided they are maintained in contact with the dialkyl disulfide for a sufficient time to be chemically incorporated into the dialkyl disulfide according to what now appearss to be a specific chemical reaction common to all aliphatic amines and dialkyl disulfides. By monitoring the vapor pressure of the aliphatic amine during the amine activation of the dialkyl disulfide (when employing an amine that has a detectable vapor pressure; e.g., diethylamine) and by repeating this measurement at incrementally increasing quantities of amine, it has been observed that an apparent 2 moles of dialkyl disulfide per 1 mole nitrogen amine is the upper stoichiometric quantity of amine being chemically incorporated into the amine activated dialkyl disulfide sulfur solvent. Under previous condition, when using the lowest molecular weight aliphatic amines, this upper stoichiometric ratio roughly corresponds to 10% by weight amine as acknowledged in the previous patent literature.

Full stoichiometeric incorporation of amine nitrogen into the dialkyl disulfide chemical is preferred when the reaction product is reused for removing deposited sulfur from a pipeline handling produced fluids. Consequently, values in excess of 10 parts by weight amine per 100 parts by weight R—S—S—R' are useful with values frequenctly being as high as 20 to about 25 parts by weight amine (particularly when the amine has a high equivalent weight such as in the case of the N-alkyl-1,3-diamine species). In fact, the presence of excess amine is not viewed as being deleterious to the observed novel increased in the sulfur dissolving rates associated with the present invention and can be of advantage in oil well applications wherein suppression of corrosion is important. Preferably, the amount of amine activation will exceed 5 parts per weight amine per 100 parts by weight dialkyl disulfide. Examples of particularly useful amines include diethylamine, triethylamine, diisopropylamine, 2-ethylhexylamine, butylamine, hexylamine, octylamine, dodecylamine and the previously mentioned N-alkyl-1, 3-propane diamines ($RNH_2CH_2CH_2CH_2NH_2$ sold under the tradename Duomeen ® by the Armak Company of Chicago, Illinois).

To the amine activated dialkyl disulfide is added from about 5 to 40 parts by weight sulfur per 100 parts dialkyl disulfide, preferably from 5 to 20 parts by weight sulfur is used. The mixture is preferably agitated until the sulfur is dissolved which typically takes a period of one hour at 76° F. The rate of dissolution of the initially added sulfur may be increased by pregrinding the sulfur and the like or by heating the disulfide amine mixture, but due to the added expense of fuel, it is preferred to dissolve the sulfur at ambient temperatures. The resulting mixture is then immediately ready for use in removing sulfur from flowlines, wells, and rock formations penetrated by sour gas and distillate wells.

Tests were performed to compare the sulfur dissolving rates and capacity of an aged amine catalyzed dialkyl disulfide solvent prepared according to U.S. Pat. No. 3,846,311 and an unaged amine/dialkyl disulfide mixture prepared in accordance with the present invention. These tests were performed at ambient laboratory conditions of standard atmospheric pressure and 76° F. temperature. The tests for each solvent involved the addition of weighed quantities of 20–30 mesh sulfur and noting the time required for each increment of sulfur to dissolve at a constant stirring rate. In the test with the unaged solvent, 100 grams of fresh mixed dialkyl disulfides was catalyzed with 7.1 grams of diethylamine at the beginning of the test. The results of this test are set out in Table 1.

TABLE 1

| Weight of 20-30 Mesh Sulphur Added | | Time for Added Sulphur to Dissolve, Minutes | | Average Rate of Dissolution of Sulphur Grams/ Minute |
|---|---|---|---|---|
| Incremental Grams | Accumulative | | | |
| | Grams | % of Solvent | Incremental | Accumulative | |
| 5.0041 | 5.0041 | 4.7 | 56.0 | 56.0 | .089 |
| 5.0038 | 10.0079 | 9.3 | 34.0 | 90.0 | .147 |
| 10.0037 | 20.0116 | 18.7 | 25.0 | 115.0 | .400 |
| 45.0042 | 65.0158 | 60.7 | 55.0 | 170.0 | .818 |
| 5.0032 | 70.0190 | 65.4 | 60.0 | 230.0 | .083 |
| 5.0055 | 75.0245 | 70.0 | 39.0 | 269.0 | .128 |
| 5.0131 | 80.0376 | 74.7 | 57.0 | 326.0 | .088 |

In the second test, the solvent used was 100 grams of an aged catalyzed dialkyl disulfide mixture. The results of this test are set out in Table 2. Table 2 does not include a listing of weight of sulfur added as a percentage of initial solvent weight because the initial weight of solvent was 100 grams and the weight of sulfur in grams, therefore, equals the percentage by weight.

TABLE 2

| Weight of 20-30 Mesh Sulfur Added, Grams | | Time for Added Sulfur to Dissolve, Minutes | | Average Rate of Dissolution of Sulfur Grams/Minute |
|---|---|---|---|---|
| Incremental | Accumulative | Incremental | Accumulative | |
| 5.0098 | 5.0098 | 46.0 | 46.0 | .109 |
| 5.0050 | 10.0148 | 27.0 | 73.0 | .185 |
| 5.0037 | 15.0185 | 21.0 | 94.0 | .238 |
| 5.0069 | 20.0254 | 13.0 | 107.0 | .385 |
| 5.0015 | 25.0269 | 13.0 | 120.0 | .385 |
| 5.0015 | 30.0284 | 14.0 | 134.0 | .357 |
| 5.0016 | 35.0300 | 13.0 | 147.0 | .385 |
| 5.0016 | 40.0316 | 20.0 | 167.0 | .250 |
| 5.0007 | 45.0323 | 13.0 | 180.0 | .385 |
| 5.0010 | 50.0333 | 23.0 | 203.0 | .217 |
| 5.0020 | 55.0353 | 24.0 | 227.0 | .208 |
| 5.0015 | 60.0368 | 25.0 | 252.0 | .200 |
| 5.0013 | 65.0381 | 25.0 | 277.0 | .200 |
| 5.0030 | 70.0411 | 41.0 | 318.0 | .122 |
| 5.0038 | 75.0449 | 53.0 | 371.0 | .094 |
| 5.0025 | 80.0474 | 53.0 | 424.0 | .094 |
| 5.0032 | 85.0506 | 52.0 | 476.0 | .096 |
| 5.0022 | 90.0528 | 38.0 | 514.0 | .132 |

An initial review of Tables 1 and 2 indicates that the aged material of Table 2 has a higher total capacity to dissolve sulfur; i.e., 90%, as compared to the unaged material's maximum capacity of 75%. In addition, the aged material of Table 2 has a slightly higher sulfur dissolving rate for the first 5% to 10% of dissolved sulfur, but when the dissolving times for the first 70%, for example, of dissolved sulfur by weight are compared, the unaged material clearly has the advantage requiring only 269 minutes compared to 318 for the aged material. When the dissolving times are considered for the 5% to 75% sulfur range, the unaged material has an even greater advantage. Thus, in Table 1, the time required for the unaged material to dissolve 70% by weight of sulfur after an initial solution of 4.7% by weight of sulfur is 270 minutes. The time required for the aged material to dissolve 70% by weight of sulfur after addition of an initial 5% by weight is 325 minutes. Likewise a comparison of the two solvents can be made after each is initially mixed with about 10% by weight sulfur. The unaged material requires 236 minutes to dissolve 65% by weight sulfur after an initial addition of 9.3% by weight of sulfur. The aged material requires 298 minutes to dissolve 65% by weight sulfur after an initial addition of 10% of sulfur. In this last example, it can be seen that for a given weight of sulfur solvent the same amount of sulfur will be dissolved by the unaged material in approximately four hours as the aged material would dissolve in five hours. Thus, it is seen than even when the aged material has an initial portion of sulfur added to increase its dissolution rate beyond its initial induction period rate, it is still considerably slower in sulfur dissolving rate over a substantial portion of its dissolving capacity than is the unaged material.

Even more important than the comparison of the absolute rates of the aged vs. unaged amine activated solvents is the relative rates of the dissolution after 5 parts or more by weight sulfur has been added to either amine/dialkyl disulfide system relative to their initial rate of dissolution. The far right column of both Table 1 and 2 contain the average rate of dissolution of sulfur expressed in terms of the number of grams of sulfur dissolving per minute during that particular time increment. In order to more readily visualize and understand the effect that adding sulfur has on the rate of dissolving additional sulfur, the average rates as found in the final column of Tables 1 and 2 are plotted in FIG. 1 as a function of the numerical value of the midpoint of the accumulative weight of sulfur dissolved during that increment. As illustrated in FIG. 1, both the aged and the unaged amine activated dialkyl disulfide sulfur solvents start with dissolution rates of the order of 0.08 to 0.1 grams of sulfur per minute. But, upon the addition of about 5 grams of sulfur in the 100 gram sample of the starting solvent, the slope of the curve became steep rising to a value many fold the original value after the addition of approximately 20 grams of sulfur. In fact, after the addition of 20 parts by weight of the sulfur per 100 parts by weight of dialkyl disulfide in the unaged example, the rate of dissolving sulfur is ten times faster than the initial rate and the rate stays at this high value well past the 40 parts by weight of sulfur per 100 parts by weight dialkyl disulfide. Similarly, the aged sample shows approximately a four fold relative increase in the rate of dissolution of sulfur. Having dissolved approximately 60 parts by weight sulfur the rate of dissolution drop off rapidly returning to values more characteristic of the initial values. In other words, in situations where it is desirable to remove a sulfur deposit very rapidly, one should select a starting composition that is characteristic of the steeply upward portion or left-hand side of the high plateau of the curves as found in FIG. 1. In this manner, the highest dissolution rates over maximum dissolving capacity will be employed.

Figure 2:
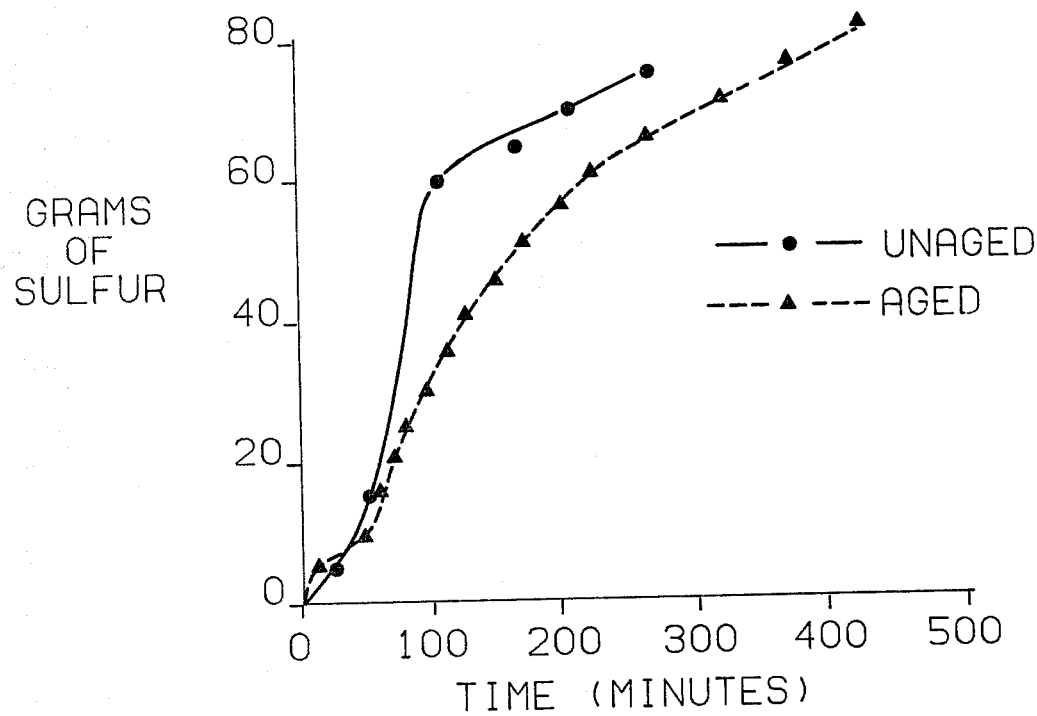
FIG. 2 of the drawing illustrates the effective cumulative dissolving capacity as a function of time for both the aged and unaged solvents of FIG. 1 after about 5 parts by weight sulfur has already been dissolved per 100 parts dialkyl disulfide.

FIG. 2 of the drawing illustrates the effective cumulative dissolving capacity of the aged and unaged tests. In making this FIG. 2, the 5 parts by weight sulfur per approximately 100 parts by weight dialkyl disulfide solution as found in Tables 1 and 2, were plotted as the origin. Thus, the curves represent relative accumulative capacity for dissolving sulfur as a function of time starting at a point wherein the initial 5 parts of sulfur has already been dissolved; i.e., no induction period. As indicated in FIG. 2, both the aged and unaged tests indicate that significant sulfur dissolving capacity is retained even after preloading the solvent with 5 parts of weight sulfur, with the unaged solvents surprisingly showing an advantage particularly during the first 100 minutes over the aged solvent. Further study of Tables 1 and 2 shows that the fractional loss in total sulfur capacity by use of unaged material is approximately the same as the resulting fractional time savings. In many cases, particularly where sulfur is being removed from flow lines and pipe lines, this savings in time is much more important than the loss in ultimate sulfur dissolving capacity.

When compared to the tables in U.S. Pat. No. 3,846,311, the total sulfur dissolving capacity shown in Tables 1 and 2 above is apparently low. This is due to the difference in temperature at which the tests were performed. Since dissolving rate is most important in surface flowlines and pipelines where long contact time is difficult to obtain, the tests illustrated herein were performed at ambient temperature more representative of such surface conditions.

Although the present invention has been illustrated in terms of a specific method, it should be apparent that the novelty of the present invention resides in establishing that a liquid phase amine/activated dialkyl disulfide wherein small amounts of sulfur have been dissolved possesses improved kinetics with respect to dissolving sulfur as indicated in FIG. 1, and the recognition that this fact can be utilized advantageously to remove an undesired sulfur deposit more rapidly. Thus, it should be equally apparent that the modifications of the method may be made within the scope of the invention as defined by the appended claims.

We claim:

1. A method of dissolving a deposit of elemental sulfur involving the steps of:
   (a) first preparing a liquid sulfur solvent composition, not in contact with said deposit of elemental sulfur to be dissolved and possessing improved kinetics relative to the dissolution of elemental sulfur, consisting of a dialkyl disulfide wherein at least one part by weight of an aliphatic saturated unsubstituted amine has been added per 100 parts by weight of said dialkyl disulfide and wherein from about 5 to 40 parts by weight of solid sulfur has been added per 100 parts by weight of said dialkyl disulfide, and
   (b) then placing said sulfur solvent composition, prepared in step (a), in contact with said deposit of elemental sulfur to be dissolved, thus dissolving said deposit.

2. A method for dissolving sulfur according to claim 1 wherein said dialkyl disulfide is a mixture of dialkyl disulfides having from about 4 to about 22 carbon atoms.

3. A method of dissolving sulfur according to claim 2 wherein said amine is a normally liquid amine having from about 4 to 12 carbon atoms.

4. A method for dissolving sulfur according to claim 3 wherein said amine is present in an amount from about 1 part to about 10 by weight per 100 parts by weight dialkyl disulfide.

5. A method for dissolving sulfur according to claim 3 wherein said amine is diethylamine.

6. A method for dissolving sulfur according to claim 1 wherein said amine is a N-alkyl-1,3-propane diamine.

7. A method for dissolving sulfur according to claim 1 wherein about 5 to 20 parts by weight of sulfur has been added per 100 parts by weight of said dialkyl disulfide.

8. A method for dissolving sulfur according to claim 7 wherein said sulfur being added to said dialkyl occurs before aging of the disulfide and amine occurs.

* * * * *

UNITED STATES PATENT OFFICE
CERTIFICATE OF CORRECTION

PATENT NO. : 4,239,630

DATED : December 16, 1980

INVENTOR(S) : Fred T. Atkinson, Shelby P. Sharp and Lamar F. Sudduth

It is certified that error appears in the above-identified patent and that said Letters Patent are hereby corrected as shown below:

Column 2, Line 59 - After "level" and before "that" insert --than--.
Column 8, Line 33 - After "dialkyl" and before "occurs" insert --disulfide--.

Signed and Sealed this

*Twenty-fourth* Day of *November 1981*

[SEAL]

Attest:

GERALD J. MOSSINGHOFF

*Attesting Officer*    *Commissioner of Patents and Trademarks*